United States Patent
Fu et al.

(10) Patent No.: US 10,851,280 B2
(45) Date of Patent: Dec. 1, 2020

(54) MODIFIED ASPHALT PARTICLES AND PREPARATION METHOD AND USE THEREOF

(71) Applicants: China Petroleum & Chemical Corporation, Beijing (CN); Dalian Research Institute of Petroleum and Petrochemicals, SINOPEC CORP., Liaoning (CN)

(72) Inventors: Li Fu, Liaoning (CN); Jiaohe Guo, Liaoning (CN); Hanrong Yao, Liaoning (CN); Shuhua Liu, Liaoning (CN); Jianfeng Zhang, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(*) Notice: Subject to any disclaimer, the term of this patent is extended or adjusted under 35 U.S.C. 154(b) by 269 days.

(21) Appl. No.: 15/772,634

(22) PCT Filed: Nov. 1, 2016

(86) PCT No.: PCT/CN2016/104188
§ 371 (c)(1),
(2) Date: May 1, 2018

(87) PCT Pub. No.: WO2017/076268
PCT Pub. Date: May 11, 2017

(65) Prior Publication Data
US 2019/0127624 A1    May 2, 2019

(30) Foreign Application Priority Data
Nov. 2, 2015   (CN) .......................... 2015 1 0729453

(51) Int. Cl.
*C08L 95/00* (2006.01)
*C08K 3/06* (2006.01)
*C09K 8/24* (2006.01)
*C09K 8/20* (2006.01)
*C09K 8/36* (2006.01)
*C09K 8/02* (2006.01)
*C09K 8/035* (2006.01)

(52) U.S. Cl.
CPC .............. *C09K 8/206* (2013.01); *C08K 3/06* (2013.01); *C08L 95/00* (2013.01); *C09K 8/02* (2013.01); *C09K 8/035* (2013.01); *C09K 8/24* (2013.01); *C09K 8/36* (2013.01)

(58) Field of Classification Search
CPC .. C08K 3/06; C08L 95/00; C09K 8/02; C09K 8/035
See application file for complete search history.

(56) References Cited

U.S. PATENT DOCUMENTS

| 3,317,447 A * | 5/1967 | Black .................... C10C 3/02 524/845 |
| 4,769,288 A | 9/1988 | Saylak |
| 5,736,030 A | 4/1998 | Tsuchitani et al. |
| 6,514,916 B1 | 2/2003 | Clampitt et al. |
| 2010/0056669 A1 | 3/2010 | Bailey |
| 2015/0252534 A1 | 9/2015 | Dempsey et al. |

FOREIGN PATENT DOCUMENTS

| CN | 1132778 A | 10/1996 |
| CN | 1239133 A | 12/1999 |
| CN | 101906311 A | 12/2010 |
| CN | 103275498 A | 9/2013 |
| CN | 104150801 A | 11/2014 |
| CN | 104559233 A | 4/2015 |
| CN | 104559955 A | 4/2015 |
| CN | 103102874 B | 9/2015 |
| CN | 105176107 A | 12/2015 |
| CN | 105585864 A | 5/2016 |

OTHER PUBLICATIONS

Xiaoying Zhang et al. "Effect of React Variation on Softening Point of Sulphur Modified Asphalt Binder", Petroleum Asphalt, Oct. 2010, vol. 24, No. 5, p. 16-19 (English Abstract on p. 19).
Liuying Wang, "Study on the preparation and properties of Insoluble Sulfur", Nanchang University, May 5, 2007.

* cited by examiner

Primary Examiner — Aiqun Li
(74) Attorney, Agent, or Firm — Novick, Kim & Lee, PLLC; Allen Xue

(57) ABSTRACT

Modified asphalt particles contain asphalt and a modifier. The modifier comprises poly-sulfur and free sulfur. The sulfur element accounts for 10-40 weight percent of the total amount of the modified asphalt particles, and the poly-sulfur accounts for 30-70 weight percent of the total amount of the sulfur element. The total particle size of the modified asphalt particle is smaller than or equal to 150 μm. The modified asphalt particles have an excellent high temperature performance, and can be used for preparing drilling fluids. Water-in-oil based drilling fluid obtained from the modified asphalt particles has low plastic viscosity, high dynamic shear force, high dynamic plastic ratio, and high emulsion-breaking voltage, and improves the high temperature resistance and cutting carrying capability of a system.

21 Claims, No Drawings

MODIFIED ASPHALT PARTICLES AND PREPARATION METHOD AND USE THEREOF

FIELD OF THE INVENTION

The present invention relates to modified asphalt particles, particularly to modified asphalt particles that have small particle size, high softening point and appropriate deformability, and a preparation method and use of the modified asphalt particles.

BACKGROUND OF THE INVENTION

Asphalt products are widely used in oil and gas drilling processes, can be used as an important constituent of drilling fluids (commonly known as mud), are of an indispensable and important type of agents in modern drilling engineering in the world, have excellent overall efficacies, including collapse prevention, lubrication, filtrate loss reduction, and high temperature stability, etc. With the development of petroleum exploration and exploitation, the drilling depth is increased continuously and the formations encountered are more and more complex, and the quantity of special wells, such as directional wells and horizontal wells, etc., is increased gradually. As a result, higher requirements are put forward for asphalt products and systems used in drilling fluids from drilling engineering. Asphalt products with an ordinary softening point can't meet the requirements of high-temperature work in deep wells for its over-softening even trickling. It is of great significance to develop high softening point asphalt, which has good high-temperature resistance performance, high plugging performance and filtrate loss reduction performance to meet the demands of oil-field drilling engineering. High softening point asphalt refers to asphalt that has a softening point equal to or higher than 100° C., especially asphalt that has a softening point equal to or higher than 120° C. High softening point asphalt is widely needed owing to its excellent high-temperature resistance performance. For example, when high softening point asphalt is used as roof coating for buildings, it will not become very soft or even trickle even in hot summer. Besides, high softening point asphalt can be used as a modification additive for macromolecular materials, etc.

In order to improve the performance of asphalt products used for drilling fluids, many methods for modifying asphalt have been disclosed by the researches of China and other foreign countries. Among those methods, the most important one is asphalt sulfonating. For example, the Chinese Patent Document No. CN101906311A has disclosed an asphalt sulfonating method, which comprises: milling a certain amount of asphalt into fine particles, adding the fine particles into kerosene, adding sulfuric acid while stirring, controlling the temperature at 45° C. or lower for 2 hours, and then adding NaOH to adjust the pH to 8-9, and separating the oil layer, and drying and milling, to obtain asphalt, etc. Though that method can increase the water solubility of the product, the oil solubility is low, and sulfonates are mainly produced through asphalt sulfonating, the softening point of the product can hardly be measured, and the product can only be used at 100° C. or lower temperature. In addition, the obtained asphalt particles have little elasticity and poor deformability, can't be embedded in the pore canals in wells freely, especially in irregular-shaped pore canals, and therefore can't attain good plugging and filtrate loss reduction effects. Besides, the process for asphalt sulfonating is more complex, and may cause environmental pollution easily.

In addition, high softening point asphalt must be used in the form of fine particles dispersed in the mud system when it is applied to drilling fluids, in order to ensure that the asphalt is dispersed uniformly and avoid agglomeration into lumps, which may clog the vibrating sieve and can't be used any more. In general, to use the asphalt particles normally, the asphalt particles must be in particle size equal to or lower than 100 meshes (150 μm), or even equal to or lower than 120 meshes (125 μm).

However, it is very difficult to mill asphalt into fine particles. Stones, coal, or the like can be milled into very fine particles in ordinary milling equipment. But asphalt is quite different from those materials. Because the temperature of the material rises significantly owing to a great deal of heat generated from friction between the milling machine and the material in the milling process. Owing to its special physical properties, asphalt will become soft and sticky as the temperature increases; consequently, the fine particles even obtained by just being milled will be agglomerated into large particles. Moreover, the smaller the particle size of the milled particles is, the more obvious the above phenomenon is.

To solve those problems, Chinese Patent Document No. CN1132778A has disclosed a method for producing fine high softening point asphalt particles, which mainly comprises three steps: firstly, mixing the raw material with water to form emulsion, then extracting and removing light constituents from the fine particles in the emulsion, and finally separating and recovering the fine asphalt particles. The method can be used to obtain fine asphalt particles, but has drawbacks, for example, the process is complex, a large quantity of organic solvent is used for extraction, and the production cost is high. In addition, drying is required in the final recovery stage; consequently, the asphalt particles may be melted partially and agglomerated again.

Chinese Patent Document No. CN103102874B has disclosed a method for preparing a high softening point asphalt composition: selecting a basic asphalt raw material, loading the basic asphalt raw material and solid dispersants into a milling machine for premixing and dispersion, and then placing the obtained mixture in a low temperature environment at 0-60° C. for 2-48 h, till the material brittles; after the low-temperature embrittlement procedure, milling the material in the milling machine, adding a coater, and mixing the mixture to a homogeneous state; thus, high softening point asphalt composition particles are obtained. The method attains some effect when it is used to solve the milling problem of high softening point asphalt. However, the introduced solid dispersant is an inert component, which may destroy the drilling fluid system to some extent. In addition, in order to ensure that the asphalt particles will not be agglomerated again when they are stored at normal temperature, an additional coater has to be added, which causes the increased cost and increased process complexity.

Therefore, it is desirable in the prior art to produce high softening point asphalt particles that are in a small particle size, will not be agglomerated in the storage process at normal temperature, and have appropriate deformability.

SUMMARY OF THE INVENTION

To overcome the above-mentioned drawbacks in the prior art, the present invention provides modified asphalt particles that can be produced as fine particles easily and have a high softening point, and a preparation method and use of the modified asphalt particles.

In the first aspect, the present invention provides modified asphalt particles, which contain asphalt and a modifier. The modifier contains poly-sulfur and free sulfur, wherein, the content of sulfur element accounts for 10-40 wt % of the total weight of the modified asphalt particles, and the content of the poly-sulfur accounts for 30-70 wt % of the total weight of the sulfur element.

In the second aspect, the present invention provides a preparation method of modified asphalt particles, which comprises the following steps:

(1) heating sulfur to a molten state in which the sulfur can have a polymerization reaction, and then adding a pre-stabilizer, charging an inert gas, and holding at 0.5-2 MPa pressure for 10-100 min., to form a liquid modifier;

(2) heating asphalt to a molten state under an airtight condition, and charging an inert gas so that the pressure is maintained at 0.2-1 MPa;

(3) controlling the liquid modifier obtained in the step (1) to contact with the molten asphalt obtained in the step (2), and holding for 10-60 min., wherein, the mass ratio of the sulfur to the asphalt is 1-4:6-9, preferably is 1.5-3.5:6.5-8.5;

(4) spraying the product obtained in the step (3) into a quenching liquid that contains a stabilizer for quenching; wherein, the pre-stabilizer is a substance that can bond with the sulfur atoms at the two ends of the molecular chain of the poly-sulfur; and the stabilizer is alcohol type substance.

In the third aspect, the present invention provides modified asphalt particle prepared with the above-mentioned preparation method.

In the fourth aspect, the present invention provides a use of the above-mentioned modified asphalt particles in drilling fluids, and a drilling fluid that contains the modified asphalt particle.

In the present invention, by introducing a mixture of poly-sulfur and non-poly-sulfur (i.e., free sulfur) as a modifier, asphalt particles, which are in a small particle size, have a high softening point and good deformability, and can be stored stably at normal temperature for a long time, are prepared. Specifically, compared with the prior art, the present invention has the following advantages.

(1) The asphalt particles provided in the present invention have a high softening point and good elastic deformability, overcome the brittleness of ordinary high softening point asphalt, and improve the service performance of the asphalt particles when used in drilling fluids. In addition, the modified asphalt particles in the present invention are in particle size ≤150 μm, and can be stored at normal temperature for a long time. The reason may be that the asphalt particles are coated with a layer of modifier that contains poly-sulfur and free sulfur, the modifier doesn't provide the function of a coating agent simply; more importantly, the poly-sulfur in the modifier and the asphalt form an integral structure, and the free sulfur provides a good dispersion and isolation function.

(2) In the preparation process of the modified asphalt particles in the present invention, a pre-stabilizer and a stabilizer are added in the two stages, i.e., sulfur melting and polymerization, and spraying of asphalt particles coated with poly-sulfur and free sulfur into the quenching liquid. On one hand, the yield ratio of the highly elastic poly-sulfur is improved to 70 wt %; on the other hand, the method provided in the present invention doesn't require extraction and purification, etc. of the free sulfur, because this part of sulfur, which is not converted, can serve as good dispersant and separant. Therefore, the high softening point particles obtained with the method provided in the present invention doesn't need any additive, i.e., it can be stored at normal temperature for a long time; thus, the production process is simplified.

(3) In the preparation method provided in the present invention, an inert gas (e.g., $N_2$) is introduced in the sulfur polymerization reaction procedure and the coating procedure, to provide a protective function at the high temperature on one hand and to provide enough power for atomization of the polymerized sulfur and molten asphalt on the other hand. The particle size of the final particles can be adjusted by adjusting the pressure to meet different requirements; specifically, the higher the pressure is, the smaller the particle size of the obtained particles is.

The modified asphalt particles provided in the present invention have excellent high temperature performance, and can be used for preparing drilling fluids. Water-in-oil based drilling fluids obtained with the modified asphalt particles provided in the present invention have low plastic viscosity, high yield point, high ratio of yield point to plastic viscosity, and high emulsion-breaking voltage, and can improve high temperature resistance and cuttings transportation capability of the system. Particularly, a high emulsion-breaking voltage is still maintained in water-in-oil based drilling fluid systems having high water content, and thereby the electric stability of the drilling fluid systems is ensured.

DETAILED DESCRIPTION OF THE EMBODIMENTS

First of all, the present invention provides modified asphalt particles, which contain asphalt and a modifier that contains poly-sulfur and free sulfur, wherein, the content of sulfur element accounts for 10-40 wt % of the total weight of the modified asphalt particles, and the content of the poly-sulfur accounts for 30-70 wt % of the total weight of the sulfur element.

According to an embodiment of the present invention, the particle size of the high softening point modified asphalt particles is ≤120 μm, the modified asphalt particles have a core-shell structure composed of a core formed by basic asphalt and a shell formed by a modifier; measured in parts by weight (pbw), the core accounts for 7-9 pbw, and the shell accounts for 1-3 pbw; the modifier comprises poly-sulfur and free sulfur, and the weight ratio of the poly-sulfur to the free sulfur in the modifier is 3:7-7:3.

The modified asphalt particles in the present invention contain sulfur element in a high content, preferably in the content of 15-35 wt % of the total weight of the modified asphalt particles. Existing unmodified asphalt (also referred to as basic asphalt for differentiation) usually has low sulfur content (the content of sulfur element is much lower than 10 wt %) and almost zero poly-sulfur content.

In the present invention, the poly-sulfur is also referred to insoluble sulfur (abbreviated as IS), and is an allotrope of ordinary elemental sulfur. The molecular structure of the poly-sulfur is a highly polymerized molecular chain in unit of 8-atom rings formed from unit rings of 8 sulfur atoms through ring opening polymerization, and the molecular weight of the poly-sulfur may be tens of thousands or even hundreds of thousands. Therefore, the poly-sulfur is insoluble in organic solvents in which ordinary elemental sulfur is highly soluble. Particularly preferably, the number of sulfur atoms on the molecular chain of poly-sulfur in the present invention is 108 or higher. Compared with small-molecule elemental sulfur, the poly-sulfur exhibits characteristic peaks within a range of 740-2960 $cm^{-1}$ in an infrared spectrogram, specifically in the vicinity of 740, 880, 1509, 1934, 2926, and 2960 cm$^{-1}$ at the same time. Therefore, the existence of poly-sulfur can be proved by detecting the characteristic peaks. The modified asphalt particles provided in the present invention exhibit characteristic peaks in the vicinity of 740, 880, 1509, 1934, 2926, and 2960 cm$^{-1}$ in the infrared spectrogram, which demonstrate that the modified asphalt particles contain poly-sulfur. In the present invention, "vicinity" refers to ±10 cm$^{-1}$.

Since the modified asphalt particles provided in the present invention contain or are coated with a poly-sulfur modifier, the softening point of the modified asphalt particles is higher than the softening point of asphalt before modification. Preferably, the softening point of the modified asphalt particles provided in the present invention is 130-210° C., more preferably is 130-180° C.

In the modified asphalt particles in the present invention, the asphalt may be any existing asphalt, preferably is asphalt with a softening point at 120-200° C., preferably 125-175° C.; further preferably the asphalt is at least one of oxidized asphalt, solvent deoiled asphalt, and natural asphalt. The main constituents of the above-mentioned different types of asphalt are essentially the same, i.e., they are mainly composed of C, H and O, and the content of element S is much lower than 10 wt %, and the content of the poly-sulfur is almost zero.

In the modified asphalt particles provided in the present invention, based on the total weight of poly-sulfur and free sulfur, the content of the poly-sulfur in the modifier is 30-70 wt %, preferably is 55-70 wt %.

According to a preferred embodiment of the present invention, the particles have a core-shell structure, the core is mainly formed by the asphalt, and the shell is mainly formed by the modifier. In the present invention, "mainly" refers that the content is higher than 50 wt %. Preferably, in the core, based on the total weight of the core, the content of asphalt is 80-100 wt %; in the shell, based on the total weight of the shell, the content of sulfur element is 80-100 wt %.

In the modified asphalt particles in the present invention, the particle size of the core of the modified asphalt particle preferably is 50-120 μm, and the thickness of the shell is 5-50 μm; further preferably the particle size of the core is 80-110 μm, the thickness of the shell is 10-30 μm.

In the present invention, the core-shell structure of the modified asphalt particle can be proved by fully impregnating and dissolving the modified asphalt particle with carbon bisulfide in a sufficient quantity. If the dissolved modified asphalt particle is still in a particle shape, then the modified asphalt particle is of core-shell structure, and the dissolved free-sulfur is a part of the shell, the remaining part of the shell is poly-sulfur, and the substance clad by the poly-sulfur is basic asphalt. Owing to the fact that almost all of the basic asphalt usually is dissolved in carbon bisulfide but the basic asphalt of the modified asphalt particles in the present invention is not dissolved by carbon bisulfide, it is proved that the basic asphalt is clad by the poly-sulfur and the core-shell structure exists. Thus, the thickness of the core and the thickness of the shell can be deduced according to the particle sizes of the modified asphalt particles before and after the modified asphalt particles are dissolved. In the modified asphalt particles obtained in embodiments of the present invention, the particle size of the core and the thickness of the shell deduced with the above-mentioned method in conjunction with the material input are within the ranges describe above.

According to a preferred embodiment of the present invention, the particle size of the modified asphalt particles is ≤150 μm, preferably is ≤120 μm, more preferably is 90-120 μm.

In the present invention, the particle size refers to average particle size, i.e., when the particles are sieved with a standard sieve with certain pore size (or mesh), if the sieved-through percent is 90% or higher, the pore size of the standard sieve is the average particle size of the particles. Both the particle size of the modified asphalt particle and the particle size of the core can be measured with that method, and the thickness of the shell is equal to the particle size of the particle subtracted by the particle size of the core.

According to a preferred embodiment of the present invention, measured in parts by weight (pbw), the core accounts for 7-9 pbw, and the shell accounts for 1-3 pbw, that is to say, based on the total weight of the modified asphalt particle, the content of the shell is 10-30 wt %, and the content of the core is 70-90 wt %.

The preparation method of modified asphalt particles provided in the second aspect of the present invention comprises the following steps:

(1) heating sulfur to a molten state in which the sulfur can have a polymerization reaction, and then adding a pre-stabilizer, charging an inert gas, and holding at 0.5-2 MPa pressure, preferably 1-2 MPa, for 10-100 min., preferably 50-95 min., more preferably 60-90 min., to form a liquid modifier;

(2) heating asphalt to a molten state under an airtight condition, and charging an inert gas so that the pressure is maintained at 0.2-1 MPa, preferably 0.5-1 MPa;

(3) controlling the liquid modifier obtained in the step (1) to contact with the molten asphalt obtained in the step (2), and holding for 10-60 min., wherein, the mass ratio of the sulfur to the asphalt is 1-4:6-9, preferably is 1-3:7-9;

(4) spraying the product obtained in the step (3) into a quenching liquid that contains a stabilizer for quenching; wherein, the pre-stabilizer is a substance that can bond with the sulfur atoms at the two ends of the molecular chain of the poly-sulfur; the stabilizer is alcohol type substance.

According to the present invention, the steps (1) and (2) are used to melt and polymerize sulfur and melt asphalt respectively. Therefore, these steps can be executed in any container that has the above-mentioned functions, such as an airtight container that supports heating and pressurization.

The step (3) is used to provide an environment in which the molten sulfur and the molten asphalt can contact with each other. Therefore, it can be executed in any contact tower.

According to the present invention, the pre-stabilizer may be any substance that can bond with the sulfur atoms at the two ends of the molecular chain of the insoluble sulfur; especially, the pre-stabilizer may be one or more of alkene, (halogenated) dialkene, halogenated aromatics, and halogenated nitro-aromatics; further preferably, the alkene and halogenated alkene may have 4-24 carbon atoms, 1 or 2 carbon-carbon double bonds, and may be linear chain, branched chain, or cyclic alkene, with one or more halogen atoms; in a case that a plurality of halogen atoms exist, the plurality of halogen atoms may be on the same carbon atom or on different carbon atoms. Further preferably, the halogenated aromatics or halogenated nitro-aromatics may have 4-24 carbon atoms, the aromatics may have one or more linear or branched alkyl or alkenyl groups as substituents, and one or more halogen atoms and nitro groups; if a plurality of halogen atoms/nitro groups exist, the plurality of halogen atoms/nitro groups may be on the same carbon atom or on different carbon atoms, may be on the carbon atoms of the aromatic ring or on carbon atoms that don't belong to the aromatic ring. Furthermore, the pre-stabilizer is selected from one or more of C10-20 linear chain alkene, C6-10 halogenated aromatics, C6-10 nitro-aromatics, and C4-8 linear chain dialkene that contains or doesn't contain a halogen element, and the halogen element preferably is one or more of Cl, Br and I. Specifically, the pre-stabilizer preferably is at least one of 1-decene, 1-undecene, 1-dodecene, 1-tridecene, 1-tetradecene, 1-pentadecene, 1-hexadecene, 1-heptadecene, 1-octadecene, butadiene, 1-chloroprene, isoprene, 2-methyl-1,3-butadiene, 1,4-dichloro-2-methyl-2-butadiene, 2,5-dichlorostyrene, 1-vinyl-3-cyclohexene, styrene, hexachloro-p-xylene, iodonitrobenzene, and bromonitrobenzene, particularly preferably is at least one of 1-dodecene, 1-tetradecene, 1-octadecene, butadiene, chloroprene, isoprene, styrene, hexachloro-p-xylene, o-iodonitrobenzene, and m-bromonitrobenzene.

Furthermore, the added amount of the pre-stabilizer is 0.01-0.5 wt % of the sulfur, preferably 0.1-0.2 wt %.

According to the present invention, the stabilizer may be any substance that contains hydroxyl (—OH), preferably is C3-10 monoalcohol or polyalcohol that contains or doesn't contain substituents, further preferably is C3-10 monoalcohol that contains or doesn't contain halogen atoms. Specifically, the stabilizer is selected from at least one of isopropanol, n-butanol, 1,4-dichloro-2-butanol, 4-chloro-1-butanol, isoamyl alcohol, 6-chloro-1-hexanol, pentaerythritol, 3-bromobenzyl alcohol and 4-bromobenzyl alcohol.

Furthermore, the added amount of the stabilizer is 0.01-0.5 wt % preferably 0.1-0.25 wt % of the sulfur.

Furthermore, the sulfur is selected from industrial-grade sulfur (at 99.5% or higher purity).

As described above, the asphalt may be any existing asphalt, preferably is asphalt with a softening point at 120-200° C., preferably 125-175° C.; further preferably the asphalt is at least one oxidized asphalt, solvent deoiled asphalt, and natural asphalt. The main constituents of the above-mentioned types of asphalt are essentially the same, and are mainly composed of C, H and O elements, and the content of element S is low.

In the present invention, the method for heating sulfur to a molten state in which the sulfur can have a polymerization reaction comprises heating sulfur at 250-350° C. for 10-60 min., preferably 30-60 min., so that the sulfur can be further stabilized after the polymerization reaction, and thereby the conversion rate of the poly-sulfur can be improved.

In the present invention, the inert gas may be charged before or after the pre-stabilizer is added.

In the present invention, the inert gas may be any gas that doesn't have any chemical reaction adverse to the preparation of the modified asphalt particles with the sulfur and asphalt, pre-stabilizer and stabilizer. For example, the inert gas may be one or more gas of nitrogen and group zero elements in the periodic table of elements.

In the present invention, the pressure is maintained at 0.5-2 MPa for 10-100 min., preferably 50-100 min. after the pre-stabilizer is added in the step (1), for the purpose of promoting the polymerization reaction and providing power to feed it into the contact tower to contact with the molten asphalt in the next step.

The pressure is maintained at 0.2-1 MPa in the step (2) is for the purpose of providing power for atomization in the contact tower in the next step.

In the present invention, all pressure values refer to absolute pressure values, unless otherwise specified.

In the present invention, the contact between the liquid modifier obtained in the step (1) and the molten asphalt obtained in the step (2) may be counter-flow contact or co-current contact, as long as they can contact sufficiently; preferably, the contact is counter-flow contact.

Preferably, the mass ratio of the sulfur to the asphalt is 1-4:6-9, preferably is 1-3:7-9, more preferably is 1.5-3:7-8.5.

In the present invention, the quenching liquid may be any liquid substance that can dissolve the product obtained in the step (3), preferably is a liquid substance that transfers heat quickly, such as one or more of sodium chloride saline water, potassium chloride saline water, calcium chloride saline water and water. Preferably, the quenching liquid is water. The temperature of the quenching liquid preferably is lower than the temperature of the product obtained in the step (3) by 50° C. or more, preferably is lower by 80° C. or more, further preferably is lower by 100° C. or more. For example, the temperature of the quenching liquid may be 0-50° C., preferably is 5-50° C., more preferably is 5-25° C.

The concentration of the stabilizer in the quenching liquid preferably is 0.001-0.1 wt %.

Preferably the quenching liquid is in volume that ensures the temperature of the material after quenching is 40-65° C., further preferably, the material is kept at 40-65° C. for 30-120 min. after quenching.

After the quenching, the material is treated by solid-liquid separation, drying and sieving; thus, the modified asphalt particles are obtained. The modified asphalt particles prepared with the method provided in the present invention have a high softening point and excellent high-temperature resistance performance. Therefore, the modified asphalt particles are also referred to as high softening point asphalt particles. The physical and chemical parameters of the modified asphalt particles have been disclosed above, and will not be detailed further. Moreover, the modified asphalt particles have appropriate elastic deformability, can be stored at normal temperature for a long time (without agglomeration), and can be used to prepare drilling fluids.

According to a preferred embodiment of the present invention, the preparation method of the modified asphalt particles comprises the following steps:

(1) heating sulfur to 250-350° C., adding a pre-stabilizer after 10-60 min., and charging inert gas at the same time, maintaining the pressure at 0.5-2.0 MPa for 10-100 min. for reaction, so that the sulfur is molten and polymerized to form a liquid modifier;

(2) heating basic asphalt in an airtight raw material tank to a molten state, and charging inert gas to maintain the pressure in the raw material tank at 0.2-1.0 MPa;

(3) spraying the liquid modifier obtained in the step (1) and the molten asphalt obtained in the step (2) into a reaction tower from the two ends of the reaction tower respectively, at a mass ratio of sulfur to basic asphalt equal to 1-4:6-9, preferably 1-3:7-9, controlling the liquid modifier and the molten asphalt to contact by counter-flow contact for 10-60 min.;

(4) spraying the product obtained in the step (3) into a quenching liquid that contains a stabilizer for quenching, to form asphalt particles that are coated by the modifier and suspend in the quenching liquid; holding at 40-65° C. for 30-120 min., and they dehydrating and drying, and sieving the obtained solid with a vibrating sieve; thus, the modified asphalt particles are obtained; wherein, the pre-stabilizer is alkene or halogenated aromatics; the stabilizer is alcohol type substance.

Accordingly, in another aspect, the present invention further provides a use of the above-mentioned modified asphalt particles in drilling fluids and a drilling fluid that contains the modified asphalt particles.

Preferably, the added amount of the modified asphalt particles in the drilling fluid is 1-10 wt %.

The drilling fluid may be an oil-based drilling fluid or water-based drilling fluid, preferably is a water-in-oil drilling fluid.

Besides the above-mentioned modified asphalt particles, the drilling fluid provided in the present invention further contains other necessary components for drilling fluid; for example, in the case of an oil-based drilling fluid, the oil-based drilling fluid further contains oil phase, saline water, emulsifier, organic soil, calcium stearate, and barite, etc. Wherein, the base fluid of the drilling fluid consists of oil phase and saline water, the volume of the oil phase usually accounts for 60-95%, and the volume of the saline water usually accounts for 5-40%.

The oil phase may be diesel oil, mineral oil, synthetic oil (e.g., alpha olefin), or oil from gas.

The emulsifier may be any emulsifier in the prior art, such as long chain fatty amide type emulsifier, Span type emulsifier, or polyoxyethylene stearate type emulsifier, etc. The added amount of the emulsifier usually is 0.5-3 wt % of the drilling fluid.

The filtrate reducer may be any filtrate reducer for oil-based drilling fluids in the prior art, including bitumen type filtrate reducer and/or modified humic acid filtrate reducer. The added amount of the filtrate reducer usually is 0.1-2 wt % of the drilling fluid.

The density of the barite preferably is 4.2-4.3 g/cm$^3$. The added amount of the barite may be determined separately according to the design density of the oil-based drilling fluid system. Usually, the density of the drilling fluid is adjusted to 1.50-2.10 g/cm$^3$.

The organic soil may be any common organic bentonite in the art, which is a non-metal mineral product that employs montmorillonite as a main mineral component and is modified for lipophilicity, such as organic bentonite modified with quaternary ammonium salt. The added amount of the organic soil usually is 1-5 wt % of the drilling fluid.

The saline water may be calcium chloride saline water, sodium formate saline water, or potassium formate saline water, etc., preferably is calcium chloride saline water. The concentration of the saline water solution usually is 10-40 wt %, preferably is 20-30 wt %.

The drilling fluid described above may be prepared by mixing the above-mentioned components to a homogeneous state.

Through reading the following non-limiting examples, those having ordinary skills in the art can understand the present invention more comprehensively, but the present invention is not limited to those examples in any way.

In the examples of the present invention, the content of free sulfur is measured with the following method: modified asphalt particles are weighed accurately, the content of sulfur element in the modified asphalt particles is measured with an elemental analysis method, and then carbon bisulfide in a quantity equal to 5 times of the weight of the modified asphalt particles is added, the modified asphalt particles are fully dissolved in the carbon bisulfide (holding overnight), and then the solution is filtered. If the solid obtained by filtering is still in a particle shape similar to the particle shape of the modified asphalt particles before the modified asphalt particles are dissolved, it is proved that the modified asphalt particles have a core-shell structure before they are dissolved; and the shell is essentially formed by sulfur, the core is essentially formed by asphalt; since the asphalt has been clad by poly-sulfur, it can't be dissolved. The percent of the quantity of the substance dissolved in the carbon bisulfide in the total weight of the sample is the percent of free sulfur. The content of sulfur element in the insoluble substance in the test is measured with an elemental analysis method again; here, the content of sulfur element is the sum of the sulfur content in the poly-sulfur and the sulfur content in the asphalt; then, the sulfur content in the basic asphalt is subtracted from the total sulfur content, and then the obtained result is divided by the percent of the insoluble substance in the total weight of the sample; thus, the content of poly-sulfur is obtained. Furthermore, an appropriate amount of particles of the insoluble substance in the carbon bisulfide after drying is taken and ground in a mortar, and then the obtained material is dissolved in carbon bisulfide; next, the carbon bisulfide solution is evaporated, and the contents of C, H, and S elements in the dry material are measured, and are verified as being essentially the same as the contents of those elements in the basic asphalt. The result further demonstrates that the cores of the particles are asphalt. Next, whether poly-sulfur exists is further proved by checking whether characteristic peaks occur in the vicinity of 740, 880, 1509, 1934, 2926, and 2960 cm$^{-1}$ in the infrared spectrogram of the modified asphalt particles. The size of the core and the thickness of the shell are calculated and verified to be within the above-mentioned ranges respectively, according to the contents of free sulfur and poly-sulfur and the particle size of the modified asphalt particles.

In the present invention, the infrared spectrogram is obtained with a film method, specifically: some particles are taken and heated up to form a film in thickness that ensures the transmission percent of light beam is 50-90% on a salt flake, the prepared flake is mounted on a sample holder of an infrared spectrometer (Model NICOLET 6700), the sample holder is placed in a sample window, and the sample is scanned and measured with an infrared beam at room temperature to obtain an infrared spectrogram.

To further verify that the sulfur content measured after dissolution and filtering is the content of poly-sulfur, in the following examples, the content of poly-sulfur in the product obtained through sulfur melting and polymerization in the step (1) is further tested with the above-mentioned dissolution and filtering method. Specifically, a sample of the product obtained through sulfur melting and polymerization in the step (1) is taken, cooled and then weighed, and then is dissolved fully (held overnight) in carbon bisulfide in an amount equal to 5 times of the weight of the sample, and the solution is filtered. The solid obtained by filtering is weighed, and the weight is the weight of poly-sulfur, the weight of the dissolved part is the weight of free sulfur; thus, the weight ratio of poly-sulfur/free sulfur is calculated.

The experimental result demonstrates that the contents of poly-sulfur measured with the above two methods are essentially the same, and the difference is within a permissible error range. Thus, it is proved that the modified asphalt particles obtained in the present invention have a core-shell structure, the core is formed by asphalt, and closely wrapped by the shell that is formed by sulfur; therefore, only the free sulfur is dissolved, while the asphalt is not dissolved because it can't contact with the solvent.

The softening points of the asphalt and the modified asphalt particle are measured with a ring and ball softening point testing method specified in GB/T4507-2014.

In the following examples, the asphalt is obtained from the vacuum residue purchased from CNPC Tahe Petrochemical Branch through oxidation or deasphalting, and the graphite is 100-200-mesh graphite powder purchased from Qingdao Huatai Co., Ltd.; the bentonite is sodium bentonite purchased from Ningbo Haishudingchuang Chemicals Co., Ltd.

Example 1

(1) 100 g sulfur powder is loaded into an airtight reactor and heated up to 280° C., 0.1 g 1-dodecene is added after 40 min., and $N_2$ is charged at the same time and the pressure is maintained at 1.0 MPa for 60 min., so that the sulfur is melted and polymerized. A sample is taken for infrared test, and characteristic peaks in the vicinity of 740, 880, 1509, 1934, 2926, and 2960 $cm^{-1}$ are found in the infrared spectrogram, indicating the existence of poly-sulfur. The measured weight ratio of poly-sulfur/free sulfur is shown in Table 1.

(2) 400 g oxidized asphalt (with 1.76 wt % sulfur content) that has 129.0° C. softening point is loaded into an enclosed raw material tank and heated up to 180° C., and $N_2$ is charged and the pressure in the raw material tank is maintained at 0.8 MPa, so that the asphalt is in a molten state.

(3) The valves of the reactor and the asphalt raw material tank are opened at the same time, and the two liquids are sprayed into a contact tower, wherein, the molten sulfur is sprayed from the top part of the tower while the molten asphalt is sprayed from the bottom part of the tower, the molten sulfur and the molten asphalt contact with each other sufficiently by counter-flow contact, and are held for 30 min. in the tower.

(4) The discharge valve at the bottom of the contact tower is opened, the liquid is sprayed quickly into 3,000 g water that contains 0.20 g isopropanol and serves as a quenching liquid at 25° C. temperature for quenching, the mixture is kept at 45° C. temperature for 30 min. so that is cured and stabilized fully; then the mixture is dehydrated and vacuum-dried. The obtained solid is sieved with a 115-mesh vibrating sieve, and the sieved-through percent is 90% or above; the sieved material under the vibrating sieve is taken as the modified asphalt particles.

The obtained modified asphalt particles are measured with a carbon bisulfide dissolution method, wherein, the insoluble substance accounts for 90.2 wt %. The data coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. Measured through elemental analysis in conjunction with calculation of sulfur content in the raw material, based on the total weight of the modified asphalt particle, the content of the shell is 19.8 wt %, and the content of the core is 80.2 wt %. The content of the shell is calculated with the following calculation formula: (quantity of sulfur contained in the particle—quantity of sulfur from the asphalt)/500*100%. The above-mentioned characteristic peaks also appear in the infrared spectrogram of the modified asphalt particles, and they further prove the existence of the poly-sulfur. The basic properties of the modified asphalt particles are shown in Table 1.

Comparative Example 1

Asphalt from the same source as the asphalt in the Example 1, graphite accounting for 18 wt % of the total material weight, and bentonite accounting for 6 wt % of the total material weight are loaded into a small high-speed pulverizer and mixed at room temperature for 5 s, the mixture is loaded into a refrigerating cabinet and refrigerated at −25° C. for 10 h, and then is pulverized at room temperature for 25 s, then water-soluble hydroxymethyl starch (a Type II product from Qinyang Xinxing Chemicals Co., Ltd.) accounting for 1.0 wt % of the total material weight is added into the mixture, and the mixture is further mixed for 5 s at room temperature, to obtain asphalt particles. Measurement is made with a carbon bisulfide dissolution method. Almost all of the asphalt is dissolved in the solvent; after filtering, only inorganic additives including graphite and bentonite are left on the filter paper, which indicates that the asphalt particles don't have a core-shell structure. The basic properties of the asphalt composition particles are shown in Table 1.

Example 2

(1) 75 g sulfur powder is loaded into an airtight reactor and heated up to 300° C., 0.12 g isoprene is added after 50 min., and $N_2$ is charged at the same time and the pressure is maintained at 1.5 MPa for 75 min. for reaction. A sample is taken and tested by infrared test, and characteristic peaks in the vicinity of 740, 880, 1509, 1934, 2926, and 2960 $cm^{-1}$ are found in the infrared spectrogram, indicating the existence of poly-sulfur. The measured weight ratio of poly-sulfur/free sulfur is shown in Table 1.

(2) 425 g asphalt (with 1.80 wt % sulfur content) with 141.2° C. softening point, which is obtained with a solvent deasphalting method, is loaded into an airtight raw material tank and heated up to a molten state, and then $N_2$ is charged and the pressure in the raw material tank is maintained at 0.6 MPa.

(3) The valves of the reactor and the asphalt raw material tank are opened at the same time, and the two liquids are sprayed into a contact tower, wherein, the molten sulfur is sprayed from the top part of the tower while the molten asphalt is sprayed from the bottom part of the tower, the molten sulfur and the molten asphalt contact with each other extensively by counter-flow contact, and are held for 45 min. in the tower.

(4) The discharge valve at the bottom of the contact tower is opened, the liquid is sprayed quickly into a quenching liquid (3,400 g water at 30° C.) that contains 0.15 g 6-chloro-1-hexanol for quenching, the mixture is kept at 60° C. temperature for 80 min. so that is cured and stabilized fully; then the mixture is dehydrated and vacuum-dried. The obtained solid is sieved with a 120-mesh vibrating sieve, and the sieve-through percent is 90% or above; the sieved material under the vibrating sieve is taken as the modified asphalt particles.

The obtained modified asphalt particles are measured with a carbon bisulfide dissolution method, wherein, the insoluble substance accounts for 92.6 wt %. The data coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. Measured through elemental analysis in conjunction with calculation of sulfur content in the raw material, based on the total weight of the modified asphalt particle, the content of the shell is 14.9 wt %, and the content of the core is 85.1 wt %. The above-mentioned characteristic peaks also appear in the infrared spectrogram of the modified asphalt particles, and they further prove the existence of the poly-sulfur. The basic properties of the modified asphalt particles are shown in Table 1.

Comparative Example 2

Asphalt from the same source as the asphalt in the Example 2, graphite accounting for 10 wt % of the total material weight, and bentonite accounting for 4 wt % of the total material weight are loaded into a small high-speed pulverizer and mixed at room temperature for 5 s, the mixture is loaded into a refrigerating cabinet and refrigerated at −30° C. for 10 h, and then is pulverized at room temperature for 35 s, then polyvinylpyrrolidone (Type K30) accounting for 1.5 wt % of the total material weight is added into the mixture, and the mixture is further mixed for 5 s, to obtain modified asphalt particles.

Example 3

(1) 150 g sulfur powder is loaded into an airtight reactor and heated up to 320° C., 0.26 g 1-octadecene is added after 55 min., and $N_2$ is charged at the same time and the pressure is maintained at 1.2 MPa for 85 min. for reaction, so that the sulfur is melted and polymerized. A sample is taken for infrared test, and characteristic peaks in the vicinity of 740, 880, 1509, 1934, 2926, and 2960 $cm^{-1}$ are found in the infrared spectrogram, indicating the existence of poly-sulfur. The measured weight ratio of poly-sulfur/free sulfur is shown in Table 1.

(2) 350 g asphalt (with 1.81 wt % sulfur content) with 152.5° C. softening point, which is obtained with a solvent deasphalting method, is loaded into an airtight raw material tank and heated up to a molten state, and then $N_2$ is charged and the pressure in the raw material tank is maintained at 0.8 MPa.

(3) The valves of the reactor and the asphalt raw material tank are opened at the same time, and the two liquids are sprayed into a contact tower, wherein, the molten sulfur is sprayed from the top part of the tower while the molten asphalt is sprayed from the bottom part of the tower, the molten sulfur and the molten asphalt contact with each other sufficiently by counter-flow contact, and are held for 50 min. in the tower.

(4) The discharge valve at the bottom of the contact tower is opened, the liquid is sprayed quickly into a quenching liquid (3,800 g water at 40° C.) that contains 0.18 g 4-chloro-1-butanol for quenching, the mixture is kept at 60° C. temperature for 100 min. so that is cured and stabilized fully; then the mixture is dehydrated and vacuum-dried. The obtained solid is sieved with a 125-mesh vibrating sieve, and the sieve-through percent is 90% or above; the sieved material under the vibrating sieve is taken as the modified asphalt particles.

The obtained modified asphalt particles are measured with a carbon bisulfide dissolution method, wherein, the insoluble substance accounts for 97.1 wt %. The data coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. Measured through elemental analysis in conjunction with calculation of sulfur content in the raw material, based on the total weight of the modified asphalt particle, the content of the shell is 29.8 wt %, and the content of the core is 70.2 wt %. The above-mentioned characteristic peaks also appear in the infrared spectrogram of the modified asphalt particles, and they further prove the existence of the poly-sulfur. The basic properties of the modified asphalt particles are shown in Table 1.

Comparative Example 3

Asphalt from the same source as the asphalt in the Example 3, graphite accounting for 10 wt % of the total material weight, and bentonite accounting for 4 wt % of the total material weight are loaded into a small high-speed pulverizer and mixed at room temperature for 5 s, the mixture is loaded into a refrigerating cabinet and refrigerated at −10° C. for 4 h, and then is pulverized at room temperature for 35 s, then polyvinylpyrrolidone (Type K30) accounting for 1.5 wt % of the total material weight is added into the mixture, and the mixture is further mixed for 5 s, to obtain modified asphalt particles.

Example 4

(1) 125 g sulfur is loaded into an airtight reactor and heated up to 340° C., 0.20 g hexachloro-p-xylene is added after 40 min., and $N_2$ is charged at the same time and the pressure is maintained at 1.6 MPa for 90 min. for reaction, so that the sulfur is melted and polymerized. A sample is taken for infrared test, and characteristic peaks in the vicinity of 740, 880, 1509, 1934, 2926, and 2960 $cm^{-1}$ are found in the infrared spectrogram, indicating the existence of poly-sulfur. The measured weight ratio of poly-sulfur/free sulfur is shown in Table 1.

(2) 375 g asphalt (with 1.78 wt % sulfur content) with 172.6° C. softening point, which is obtained with a solvent deasphalting method, is loaded into an airtight raw material tank and heated up to a molten state, and then $N_2$ is charged and the pressure in the raw material tank is maintained at 1.0 MPa.

(3) The valves of the reactor and the asphalt raw material tank are opened at the same time, and the two liquids are sprayed into a contact tower, wherein, the molten sulfur is sprayed from the top part of the tower while the molten asphalt is sprayed from the bottom part of the tower, the molten sulfur and the molten asphalt contact with each other sufficiently by counter-flow contact, and are held for 50 min. in the tower.

(4) The discharge valve at the bottom of the contact tower is opened, the liquid is sprayed quickly into a quenching liquid (4,000 g water at 50° C.) that contains 0.25 g isopropanol for quenching, the mixture is kept at 50° C. temperature for 100 min. so that is cured and stabilized fully; then the mixture is dehydrated and vacuum-dried. The obtained solid is sieved with a 160-mesh vibrating sieve, and the sieve-through percent is 90% or above; the sieved material under the vibrating sieve is taken as the modified asphalt particles.

The obtained modified asphalt particles are measured with a carbon bisulfide dissolution method, wherein, the insoluble substance accounts for 97.1%. The data coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. Measured through elemental analysis in conjunction with calculation of sulfur content in the raw material, based on the total weight of the modified asphalt particle, the content of the shell is 24.9 wt %, and the content of the core is 75.1 wt %. The above-mentioned characteristic peaks also appear in the infrared spectrogram of the modified asphalt particles, and they further prove the existence of the polysulfur. The basic properties of the modified asphalt particles are shown in Table 1.

Comparative Example 4

Asphalt from the same source as the asphalt in the Example 4 and graphite accounting for 20 wt % of the total material weight are loaded into a small high-speed pulverizer and mixed at room temperature for 5 s, the mixture is loaded into a refrigerating cabinet and refrigerated at −25° C. for 6 h, and then is pulverized at room temperature for 35 s, then polyvinylpyrrolidone (Type K30) accounting for 1.8 wt % of the total material weight is added into the mixture, and the mixture is further mixed for 5 s, to obtain modified asphalt particles. The basic properties of the modified asphalt particles are shown in Table 1.

Comparative Example 5

Asphalt particles are prepared with the method described in the Example 4, except that the 0.20 g hexachloro-p-xylene is omitted. Thus, modified asphalt particles are obtained. The basic properties of the modified asphalt particles are shown in Table 1.

Comparative Example 6

Asphalt particles are prepared with the method described in the Example 4, except that the molten sulfur is directly mixed with asphalt without polymerization, i.e., the molten sulfur is directly mixed with asphalt after nitrogen is charged without reaction for 90 min.; thus, modified asphalt particles are obtained. The basic properties of the modified asphalt particles are shown in Table 1.

Comparative Example 7

Asphalt particles are prepared with the method described in the Example 4, except that no isopropanol is added in the quenching liquid; thus, modified asphalt particles are obtained. The basic properties of the modified asphalt particles are shown in Table 1.

Comparative Example 8

Asphalt particles are prepared with the method described in the Example 4, except that nitrogen is not charged into the airtight reactor; thus, modified asphalt particles are obtained. The basic properties of the modified asphalt particles are shown in Table 1.

Comparative Example 9

Asphalt particles are prepared with the method described in the Example 4, except that the amount of the sulfur powder is 30 g; thus, modified asphalt particles are obtained. The basic properties of the modified asphalt particles are shown in Table 1.

Example 5

Asphalt particles are prepared with the method described in the Example 4, except that the amount of the sulfur powder is 150 g; thus, modified asphalt particles are obtained. The basic properties of the modified asphalt particles are shown in Table 1.

Example 6

Asphalt particles are prepared with the method described in the Example 4, except that the pressure values are maintained at 0.2 MPa respectively in the step (1) and step (2) after nitrogen is charged; thus, modified asphalt particles are obtained. The basic properties of the modified asphalt particles are shown in Table 1.

Example 7

Asphalt particles are prepared with the method described in the Example 4, but the 0.20 g hexachloro-p-xylene is replaced with 0.1 g hexachloro-p-xylene and 0.10 g 2-iodonitrobenzene in the step (1). Thus, modified asphalt particles are obtained. The basic properties of the modified asphalt particles are shown in Table 1.

TABLE 1

| | Softening point, °C. | Sulfur content, wt % | Polysulfur/free sulfur | Average particle size, μm | Sieve-through percent, % |
|---|---|---|---|---|---|
| Example 1 | 131.9 | 21.2 | 5.9:4.1 | 115 | 97.1 |
| Comparative example 1 | 129.8 | 1.46 | — | 115 | 98.1 |
| Example 2 | 143.7 | 16.3 | 6.2:3.8 | 120 | 97.5 |
| Comparative example 2 | 141.5 | 1.55 | — | 120 | 98.2 |
| Example 3 | 154.8 | 31.1 | 6.7:3.3 | 115 | 96.4 |
| Comparative example 3 | 152.3 | 1.50 | — | 115 | 98.3 |
| Example 4 | 176.1 | 26.2 | 6.8:3.2 | 96 | 95.2 |
| Comparative example 4 | 173.0 | 1.47 | — | 96 | 96.8 |
| Comparative example 5 | 174.1 | 26.0 | 5.2:4.8 | 96 | 96.5 |
| Comparative example 6 | 172.9 | 25.8 | — | 96 | 95.4 |
| Comparative example 7 | 173.4 | 25.8 | 4.1:5.9 | 109 | 96.6 |
| Comparative example 8 | 174.8 | 26.0 | 6.4:3.6 | In lump shape | — |
| Comparative example 9 | 174.0 | 7.48 | 6.6:3.4 | 109 | 96.8 |
| Example 5 | 176.2 | 30.9 | 6.7:3.3 | 109 | 95.8 |
| Example 6 | 175.9 | 25.9 | 6.2:3.8 | 150 | 90.4 |
| Example 7 | 176.2 | 26.0 | 6.5:3.5 | 109 | 96.6 |

Note:
The sieve-through percent refers to the percent of the mass of particles passing through the sieve in the total mass of the particles when the particles stored in pile at normal temperature for 30 days are sieved with a standard sieve that has the same pore size as the standard sieve used in the preparation of the particles. This indicator is mainly used to evaluate the stability of the particles after storage, i.e., the change of particle size. The average particle size means: when the particles are sieved with a standard sieve with certain pore size (or mesh), if the sieved-through percent is 90% or higher, the pore size of the standard sieve is the average particle size of the particles.
"—" represents that the component doesn't exist or is unable to detect. That also applies in the following text.

Performance Test Example 1

Preparation of Water-in-Oil Drilling Fluid:
Diesel oil 0#and calcium chloride saline water (20 wt % concentration) are mixed at 75:25 volume ratio of oil to water, 1.0 wt % Span-80 is added into the mixture, and then the mixture is stirred at a high speed at normal temperature for 30 min., then 2.0 wt % organic soil and 3.0 wt % calcium stearate are added, and the mixture is sheared for 20 min.; thus, a base mud of water-in-oil drilling fluid is obtained.

The modified asphalt particles obtained in the above examples and comparative examples are added (in 3 wt % amount) into the base mud of water-in-oil drilling fluid respectively, then 0.2 wt % sodium dodecyl sulfate is added, and the mixture is sheared at 8,000-10,000 r/min. speed for 30 min. A weighting agent (barite) is added to adjust the density of the drilling fluid to a desired value (usually 1.50-2.10 g/cm$^3$), to obtain a drilling fluid. The properties of the drilling fluid are shown in Table 2.

The contents of the components in the above and the following base muds and drilling fluids are based on the total weight of the base muds respectively.

The indicators of the drilling fluids, including apparent viscosity (AV), plastic viscosity (PV), yield point (YP), ratio of yield point to plastic viscosity (YP/PV), HTHP filtrate loss (FL$_{HTHP}$, at 3.5 MPa pressure and 180° C. temperature), and emulsion-breaking voltage (ES), etc., are tested as per GB/T16783.2-2012 "Petroleum and Natural Gas Industries—Field Testing of Drilling Fluids—Part 2: Oil-Based Fluids", wherein, the hot rolling conditions include: 16 h time, 180° C. temperature; the temperature of rheological property test is 60° C.

TABLE 2

| | ρ/ g·cm$^{-3}$ | AV/ mPa·s | PV/ mPa·s | YP/ Pa | YP/ PV | FL$_{HTHP}$/ ml | ES/V |
|---|---|---|---|---|---|---|---|
| Base mud | 1.70 | 43.5 | 30.5 | 7.5 | 0.25 | 50.2 | 1340 |
| Example 1 | 1.70 | 45.5 | 32.5 | 14.0 | 0.43 | 7.5 | 1750 |
| Comparative example 1 | 1.62 | 43.0 | 30.0 | 9.2 | 0.31 | 26.5 | 1390 |
| Example 2 | 1.68 | 45.0 | 31.5 | 14.0 | 0.44 | 8.0 | 1780 |
| Comparative example 2 | 1.67 | 44.0 | 31.0 | 9.5 | 0.31 | 23.6 | 1410 |
| Example 3 | 1.72 | 44.5 | 34.0 | 15.5 | 0.46 | 6.4 | 1820 |
| Comparative example 3 | 1.71 | 44.2 | 30.8 | 9.8 | 0.32 | 22.5 | 1425 |
| Example 4 | 1.74 | 45.5 | 32.0 | 15.8 | 0.49 | 4.5 | 1880 |
| Comparative example 4 | 1.72 | 44.2 | 31.2 | 10.0 | 0.32 | 20.8 | 1450 |
| Comparative example 5 | 1.72 | 46.0 | 30.0 | 12.0 | 0.4 | 12.2 | 1550 |
| Comparative example 6 | 1.68 | 43.2 | 30.3 | 9.0 | 0.30 | 28.6 | 1375 |
| Comparative example 7 | 1.73 | 45.0 | 30.5 | 11.2 | 0.37 | 14.8 | 1530 |
| Comparative example 8 | — | — | — | — | — | — | — |
| Comparative example 9 | 1.71 | 44.0 | 30.2 | 10.5 | 0.35 | 17.6 | 1500 |
| Example 5 | 1.75 | 46.5 | 32.4 | 16.0 | 0.49 | 5.3 | 1875 |
| Example 6 | 1.72 | 45.8 | 30.9 | 14.3 | 0.46 | 10.2 | 1850 |
| Example 7 | 1.76 | 45.6 | 31.4 | 15.5 | 0.49 | 5.3 | 1910 |

It is seen from the data in the above table: with the modified asphalt particles provided in the present invention, the HTHP filtrate loss of a water-in-oil based drilling fluid can be reduced effectively.

In addition, water-in-oil based drilling fluids that contain the modified asphalt particles provided in the present invention have low plastic viscosity, high yield point, high ratio of yield point to plastic viscosity, and high emulsion-breaking voltage, and can improve high temperature resistance and cuttings transportation capability of the system. Particularly, a high emulsion-breaking voltage is still maintained in water-in-oil based drilling fluid systems having high water content, and thereby the electric stability of the drilling fluid systems is ensured.

Example 8

(1) 100 g sulfur powder is loaded into an airtight reactor and heated up to 280° C., 0.1 g 1-dodecene is added after 40 min., and N$_2$ is charged at the same time and the pressure is maintained at 1.0 MPa for 60 min., so that the sulfur is melted and polymerized. A sample is taken and tested by infrared test, and characteristic peaks in the vicinity of 740, 880, 1509, 1934, 2926, and 2960 cm$^{-1}$ are found in the infrared spectrogram, indicating the existence of poly-sulfur. The measured weight ratio of poly-sulfur/free sulfur is shown in Table 3.

(2) 400 g asphalt (with 1.80 wt % sulfur content) with 131.3° C. softening point, which is obtained with a solvent deasphalting method, is loaded into an airtight raw material tank and heated up to a molten state, and then N$_2$ is charged and the pressure in the raw material tank is maintained at 0.8 MPa, so that the asphalt is kept in the molten state.

(3) The valves of the reactor and the asphalt raw material tank are opened at the same time, and the two liquids are sprayed into a contact tower, wherein, the molten sulfur is sprayed from the top part of the tower while the molten asphalt is sprayed from the bottom part of the tower, the molten sulfur and the molten asphalt contact with each other sufficiently by counter-flow contact, and are held for 30 min.

(4) The discharge valve at the bottom of the contact tower is opened, the liquid is sprayed quickly into 3,500 g water (at 25° C.) that contains 0.20 g isopropanol for quenching, the mixture is kept at 45° C. temperature for 60 min. so that is cured and stabilized fully; then the mixture is dehydrated and vacuum dried. The obtained solid is sieved with a vibrating sieve, and the sieved-through percent is 90 wt % or above; the sieved material under the vibrating sieve is taken as the modified asphalt particles.

The modified asphalt particles are measured with a carbon bisulfide dissolution method, and the result coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. The above-mentioned characteristic peaks also appear in the infrared spectrogram of the modified asphalt particles, and they further prove the existence of the poly-sulfur. The basic properties of the modified asphalt particles are shown in Table 3.

Example 9

(1) 75 g sulfur powder is loaded into an airtight reactor and heated up to 300° C., 0.12 g isoprene is added after 50 min., and N$_2$ is charged at the same time and the pressure is maintained at 1.5 MPa for 75 min. for reaction. A sample is taken for infrared test, and characteristic peaks in the vicinity of 740, 880, 1509, 1934, 2926, and 2960 cm$^{-1}$ are found in the infrared spectrogram, indicating the existence of poly-sulfur. The measured weight ratio of poly-sulfur/free sulfur is shown in Table 3.

(2) 425 g asphalt (with 1.78 wt % sulfur content) with 146.2° C. softening point, which is obtained with a solvent deasphalting method, is loaded into an airtight raw material tank and heated up to a molten state, and then N$_2$ is charged and the pressure in the raw material tank is maintained at 0.6 MPa.

(3) The valves of the reactor and the asphalt raw material tank are opened, and the two liquids are sprayed into a contact tower, wherein, the molten sulfur is sprayed from the top part of the tower while the molten asphalt is sprayed from the bottom part of the tower, the molten sulfur and the molten asphalt contact with each other sufficiently by counter-flow contact, and are held for 35 min.

(4) The discharge valve at the bottom of the contact tower is opened, the liquid is sprayed quickly into 3,000 g water (at 20° C.) that contains 0.15 g 6-chloro-1-hexanol for quenching, the mixture is kept at 60° C. temperature for 80 min. so that is cured and stabilized fully; then the mixture is dehydrated and vacuum-dried. The obtained solid is sieved with a vibrating sieve, and the sieved-through percent is 90% or above; the sieved material under the vibrating sieve is taken as the modified asphalt particles.

The modified asphalt particles are measured with a carbon bisulfide dissolution method, and the result coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. The above-mentioned characteristic peaks also appear in the infrared spectrogram of the modified asphalt particles, and they further prove the existence of the poly-sulfur. The basic properties of the modified asphalt particles are shown in Table 3.

Example 10

(1) 150 g sulfur powder is loaded into an airtight reactor and heated up to 320° C., 0.26 g 1-octadecene is added after 55 min., and $N_2$ is charged at the same time and the pressure is maintained at 1.2 MPa for 85 min. for reaction, so that the sulfur is melted and polymerized. A sample is taken and tested by infrared test, and characteristic peaks in the vicinity of 740, 880, 1509, 1934, 2926, and 2960 $cm^{-1}$ are found in the infrared spectrogram, indicating the existence of poly-sulfur. The measured weight ratio of poly-sulfur/free sulfur is shown in Table 3.

(2) 350 g asphalt (with 1.80 wt % sulfur content) with 155.5° C. softening point, which is obtained with a solvent deasphalting method, is loaded into an airtight raw material tank and heated up to a molten state, and then $N_2$ is charged and the pressure in the raw material tank is maintained at 0.8 MPa for 85 min. for reaction.

(3) The valves of the reactor and the asphalt raw material tank are opened, and the two liquids are sprayed into a contact tower, wherein, the molten sulfur is sprayed from the top part of the tower while the molten asphalt is sprayed from the bottom part of the tower, the molten sulfur and the molten asphalt contact with each other sufficiently by counter-flow contact, and are held for 50 min.

(4) The discharge valve at the bottom of the contact tower is opened, the liquid is sprayed quickly into 4,000 g water (at 20° C.) that contains 0.18 g 4-chloro-1-butanol for quenching, the mixture is kept at 60° C. temperature for 100 min. so that is cured and stabilized fully; then the mixture is dehydrated and vacuum-dried. The obtained solid is sieved with a vibrating sieve, and the sieved-through percent is 90% or above; the sieved material under the vibrating sieve is taken as the modified asphalt particles.

The modified asphalt particles are measured with a carbon bisulfide dissolution method, and the result coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. The above-mentioned characteristic peaks also appear in the infrared spectrogram of the modified asphalt particles, and they further prove the existence of the poly-sulfur. The basic properties of the modified asphalt particles are shown in Table 3.

Example 11

(1) 125 g sulfur powder is loaded into an airtight reactor and heated up to 340° C., 0.20 g hexachloro-p-xylene is added after 40 min., and $N_2$ is charged at the same time and the pressure is maintained at 1.6 MPa for 90 min. for reaction, so that the sulfur is melted and polymerized. A sample is taken and tested by infrared test, and characteristic peaks in the vicinity of 740, 880, 1509, 1934, 2926, and 2960 $cm^{-1}$ are found in the infrared spectrogram, indicating the existence of poly-sulfur. The measured weight ratio of poly-sulfur/free sulfur is shown in Table 3.

(2) 375 g asphalt (with 1.76 wt % sulfur content) with 170.6° C. softening point, which is obtained with a solvent deasphalting method, is loaded into an airtight raw material tank and heated up to a molten state, and then $N_2$ is charged and the pressure in the raw material tank is maintained at 1.0 MPa.

(3) The valves of the reactor and the asphalt raw material tank are opened, and the two liquids are sprayed into a contact tower, wherein, the molten sulfur is sprayed from the top part of the tower while the molten asphalt is sprayed from the bottom part of the tower, the molten sulfur and the molten asphalt contact with each other sufficiently by counter-flow contact, and are held for 50 min.

(4) The discharge valve at the bottom of the contact tower is opened, the liquid is sprayed quickly into 3,800 g water (at 20° C.) that contains 0.25 g isopropanol for quenching, the mixture is kept at 50° C. temperature for 100 min. so that is cured and stabilized fully; then the mixture is dehydrated and vacuum-dried. The obtained solid is sieved with a vibrating sieve, and the sieved-through percent is 90% or above; the sieved material under the vibrating sieve is taken as the modified asphalt particles.

The modified asphalt particles are measured with a carbon bisulfide dissolution method, and the result coincides to the weight ratio of poly-sulfur/free sulfur measured in the step (1), indicating that the asphalt has been clad poly-sulfur and a core-shell structure is formed. The core is essentially formed by asphalt, while the shell is essentially formed by sulfur. The above-mentioned characteristic peaks also appear in the infrared spectrogram of the modified asphalt particles, and they further prove the existence of the poly-sulfur. The basic properties of the modified asphalt particles are shown in Table 3.

TABLE 3

| | Softening point, ° C. | Sulfur content, wt % | Poly-sulfur/free sulfur | Average particle size, μm | Sieve-through percent, % |
|---|---|---|---|---|---|
| Example 8 | 132.2 | 21.0 | 5.8:4.2 | 110 | 97.1 |
| Example 9 | 147.1 | 15.9 | 6.1:3.9 | 120 | 98.2 |
| Example 10 | 155.7 | 30.8 | 6.5:3.5 | 90 | 96.4 |
| Example 11 | 171.3 | 26.1 | 6.6:3.4 | 80 | 95.6 |

Performance Test Example 2

Preparation of Water-Based Drilling Fluid:

1000 mL distilled water is measured accurately and loaded into a high-speed stirring cup, 1.8 g anhydrous sodium carbonate is added into the cup and dissolved fully, 40 g sodium bentonite is weighed and loaded into the cup, and then the mixture is stirred at 10,000 r/min. speed for 20 min., maintained for 24 h, and then 3-5 wt % sulfonated phenolic resin (Type SMP-I from Zhengzhou Yuhua Additives Co., Ltd.), 0.5-1.0 wt % SP-80 and 1-1.5 wt % sodium hydroxymethyl cellulose (Type HV-CMC from Zhengzhou Yuhua Additives Co., Ltd.) are added into the mixture, and the mixture is stirred for 30 min. further; thus, a base mud of water-based drilling fluids shown in the following table is obtained.

The modified asphalt particles obtained in the above examples are added (in 3.0 wt % amount) into 400 mL base mud of water-based drilling fluid prepared above respectively, the mixture is sheared at a high speed (8,000-10,000 r/min.) for 10 min., and then sodium dodecyl sulfate accounting for 0.2% of the mass of the base mud is added into the mixture, and the mixture is sheared further for 10 min.; thus, a water-based drilling fluid system is obtained. The properties of the water-based drilling fluid system are shown in Table 4.

TABLE 4

| | | AV/ mPa·s | PV/ mPa·s | Filtrate loss at medium pressure/mL | HTHP filtrate loss/ mL | After aging |
|---|---|---|---|---|---|---|
| Example 8 | Base mud | 7.6 | 5.7 | 38.2 | 77.3 | Dispersed stably |
| | Base mud + asphalt | 14.2 | 10.8 | 21.0 | 16.3 | Dispersed stably |
| Example 9 | Base mud | 7.4 | 5.3 | 35.6 | 74.6 | Dispersed stably |
| | Base mud + asphalt | 14.8 | 11.5 | 16.9 | 23.4 | Dispersed stably |
| Example 10 | Base mud | 8.8 | 6.5 | 36.5 | 75.4 | Dispersed stably |
| | Base mud + asphalt | 16.6 | 13.2 | 18.2 | 26.2 | Dispersed stably |
| Example 11 | Base mud | 8.0 | 7.5 | 37.7 | 72.0 | Dispersed stably |
| | Base mud + asphalt | 17.5 | 14.3 | 18.2 | 24.5 | Dispersed stably |

Note:
The test pressure for testing filtrate loss at medium pressure is 0.69 MPa, and the aging conditions are: 160° C., 16 h.
The result in the Table 4 demonstrates: when the modified asphalt particles provided in the present invention are added into a water-based drilling fluid, the filtrate loss of the system, especially the HTHP filtrate loss, can be reduced remarkably.

The invention claimed is:

1. A modified asphalt particle comprising asphalt and a modifier that contains poly-sulfur and free sulfur, wherein a total weight of the poly-sulfur and the free sulfur accounts for 10-40 wt % of a total weight of the modified asphalt particle, and the poly-sulfur accounts for 30-70 wt % of the total weight of the poly-sulfur and the free sulfur, wherein the modified asphalt particle has a particle size of less than or equal to 150 μm, and comprises a core and a shell covering the core, wherein the core has a particle size of 50-120 μm, and the shell has a thickness of 5-50 μm.

2. The modified asphalt particle according to claim 1, wherein an infrared spectrogram of the modified asphalt particle has characteristic peaks of poly-sulfur within a range of 740-2960 cm$^{-1}$.

3. The modified asphalt particle according to claim 2, wherein an infrared spectrogram of the modified asphalt particle has characteristic peaks of poly-sulfur in the vicinity of 740 cm$^{-1}$, 880 cm$^{-1}$, 1509 cm$^{-1}$, 1934 cm$^{-1}$, 2926 cm$^{-1}$, and 2960 cm$^{-1}$.

4. The modified asphalt particle according to claim 1, wherein the poly-sulfur accounts for 55-70 wt % of the total weight of the poly-sulfur and the free sulfur.

5. The modified asphalt particle according to claim 1, wherein, based on the total weight of the modified asphalt particle, the total weight of the poly-sulfur and the free sulfur is 15-35 wt %, and the asphalt is 65-85 wt %.

6. The modified asphalt particle according to claim 1, wherein a softening point of the modified asphalt particle is 130-210° C.

7. The modified asphalt particle according to claim 1, wherein the particle size of the modified asphalt particle is 90-120 μm, and based on the total weight of the modified asphalt particle, the content of the shell is 10-30 wt %, and the content of the core is 70-90 wt %.

8. A preparation method of modified asphalt particle of claim 1, comprising the following steps:
(1) heating sulfur to a molten state wherein the molten sulfur comprises poly-sulfur and free sulfur, adding a pre-stabilizer into the molten sulfur, charging an inert gas, and holding at 0.5-2 MPa for 10-100 min., to form a liquid modifier;
(2) heating asphalt to a molten state under an airtight condition, and charging an inert gas so that the pressure is maintained at 0.2-1 MPa;
(3) controlling the liquid modifier obtained in the step (1) to contact with the molten asphalt obtained in the step (2), and holding for 10-60 min., wherein a mass ratio of the sulfur to the asphalt is 1-4:6-9;
(4) spraying the product obtained in the step (3) into a quenching liquid that contains a stabilizer for quenching;
wherein the pre-stabilizer is a substance that can bond with the sulfur atoms at two ends of the molecular chain of the poly-sulfur; the stabilizer is an alcohol.

9. The preparation method according to claim 8, wherein the pre-stabilizer is alkene, dialkene, halogenated dialkene, halogenated aromatics, halogenated nitro-aromatics, or a mixture thereof;
and the added amount of the pre-stabilizer is 0.01-0.5 wt % of the sulfur.

10. The preparation method according to claim 8, wherein the stabilizer is C3-10 monoalcohol or polyalcohol that are optionally substituted;
and the added amount of the stabilizer is 0.01-0.5 wt % of the sulfur.

11. The preparation method according to claim 8, wherein the pre-stabilizer is 1 dodecene, 1-tetradecene, 1-octadecene, butadiene, chloroprene, isoprene, hexachloro-p-xylene, iodonitrobenzene, bromonitrobenzene, or a mixture thereof, and the stabilizer is isopropanol, 4-chloro-1-butanol, 6-chloro-1-hexanol, 4-bromobenzyl alcohol, or a mixture thereof.

12. The preparation method according to claim 8, wherein the step of heating sulfur to a molten state is carried out at 250-350° C. for 10-60 min.

13. The preparation method according to claim 8, wherein in the step (3), the liquid modifier obtained in the step (1) and the molten asphalt obtained in the step (2) are controlled to have a counter-flow contact.

14. The preparation method according to claim 8, wherein a softening point of the asphalt is 120-200° C.

15. The preparation method according to claim 8, wherein a concentration of the stabilizer in the quenching liquid is 0.001-0.1 wt %, a temperature of the quenching liquid is 0-50° C., and a quenching time during which the product contacts with the quenching liquid is 30-120 min.

16. A drilling fluid comprising the modified asphalt particle according to claim 1.

17. The drilling fluid according to claim 16, wherein an amount of the modified asphalt particle in the drilling fluid is 1-10 wt %.

18. The drilling fluid according to claim 16, wherein an infrared spectrogram of the modified asphalt particle has characteristic peaks of poly-sulfur in the vicinity of 740 $cm^{-1}$, 880 $cm^{-1}$, 1509 $cm^{-1}$, 1934 $cm^{-1}$, 2926 $cm^{-1}$, and 2960 $cm^{-1}$.

19. The drilling fluid according to claim 16, wherein a softening point of the modified asphalt particle is 130-210° C.

20. The drilling fluid according to claim 16, wherein based on a total weight of the modified asphalt particle, a content of the shell is 10-30 wt %, and a content of the core is 70-90 wt %.

21. The drilling fluid according to claim 16, wherein the particle size of the modified asphalt particle is 90-120 μm, a particle size of the core is 80-110 μm, and a thickness of the shell is 10-30 μm.

* * * * *